United States Patent [19]
Popeil et al.

[11] Patent Number: 5,515,990
[45] Date of Patent: May 14, 1996

[54] POT WITH TILT INSERT

[76] Inventors: Ronald M. Popeil, 3950 Koval La., Las Vegas, Nev. 89109; Alan L. Backus, 11425 Rochester Ave., #23, Los Angeles, Calif. 90025

[21] Appl. No.: 311,787

[22] Filed: Sep. 26, 1994

[51] Int. Cl.$^6$ ................................................ B65D 21/032
[52] U.S. Cl. ...................... 220/23.86; 206/514; 220/912; 220/608; 220/408
[58] Field of Search .................... 206/505, 507, 206/514; 220/DIG. 6, 23.83, 23.86, 737, 912, 608, 8, 408, 23.6, 410

[56] References Cited

U.S. PATENT DOCUMENTS

| | | | |
|---|---|---|---|
| 611,705 | 10/1898 | Obermann | 220/408 |
| 685,832 | 11/1901 | Gender | 220/608 |
| 1,170,786 | 2/1916 | Thomas | 220/408 |
| 3,742,965 | 7/1973 | Hudziak | 220/410 |
| 4,750,632 | 6/1988 | Pieper | 220/23.83 |

FOREIGN PATENT DOCUMENTS 2113074  8/1983  United Kingdom .................. 220/408

*Primary Examiner*—Stephen J. Castellano
*Attorney, Agent, or Firm*—Keck, Mahin & Cate

[57] ABSTRACT

A pot, such as a pasta pot or deep fat fryer, with an insert which is able to be lifted and then rested in a tilted position on top of the pot. The insert has a series of concave dents where its side wall meets its bottom. These dents engage the pot when the insert is rested in a tilted position on top of the pot. This engagement helps prevent the insert from slipping back into the pot and splashing hot liquid.

9 Claims, 3 Drawing Sheets

POT WITH TILT INSERT

FIELD OF INVENTION

The present invention is directed to pots and pans which have inserts that rest on the pot or pan in a tilted position for drainage or other purposes.

BACKGROUND OF INVENTION

Pots and pans with inserts which tilt have been around for many, many years. As an example, pots to boil pasta frequently have a strainer insert which is lifted out of the pot and then tilted and rested on top of the pot to allow the pasta to drain excess water. Deep fat fryers provide yet another example where a screen or sheet metal insert is lifted out of the boiling oil and rested in a tilted position on top of the pot to allow the fried food in the insert to drain.

The problem with previous designs is that their inserts may be unstable when tilted and rested on top of the pot and thus they may accidentally drop back into the pot with the risk of splashing hot liquid.

SUMMARY OF INVENTION

A preferred embodiment of the present invention provides a plurality of indents on the base of its pot insert which stabilize the insert when it is lifted, tilted and rested on top of the inserted pot. When the insert is at rest and tilted on top of the pot, the insert touches the pot on the insert's side and engages it on two of the insert's base indents (see FIG. 1).

The indents provide mechanical engagement between a rim in the upper portion of the pot and the base of the insert, which in turn provides an extra level of safety against the insert slipping and dropping back into the pot.

DETAILED SPECIFICATION

Figure 1:
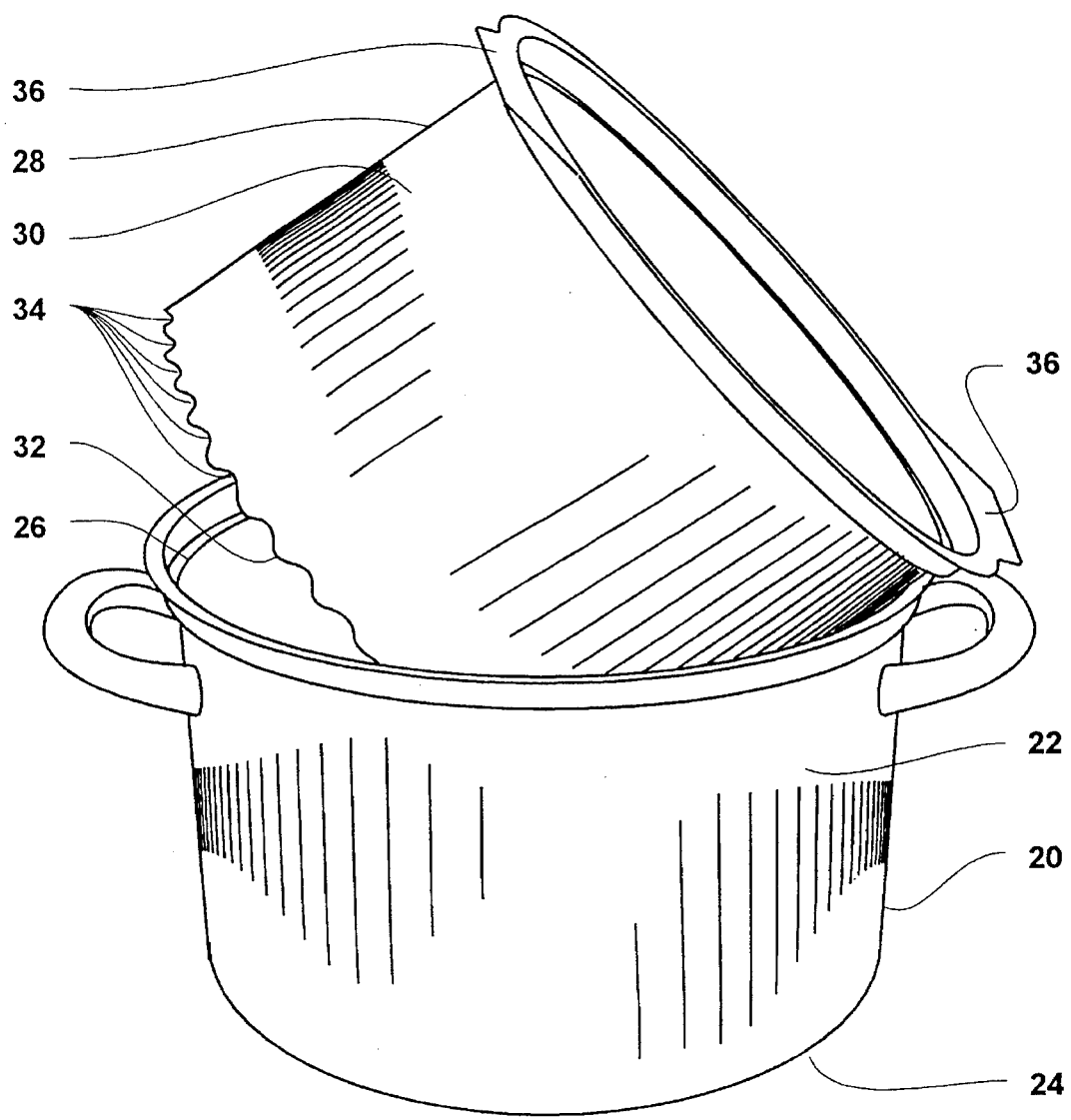
FIG. 1 shows a perspective view of a preferred embodiment of the present invention where the insert is lifted out of the pot and is rested on top of the pot in a tilted position.

A preferred embodiment of the present invention is comprised of: a pot 20 with a curved side wall 22, a bottom wall 24, and an upper rim 26; and an insert 28 with a curved side wall 30 and a bottom wall 32. The insert, when viewed from its exterior, has a series of concave dents 34 where its curved side wall 30 intersects its bottom wall 32. The insert nests in the pot in a collapsed telescope like manner. When the insert 28 is lifted out of the pot 20 and rested in a tilted position on top of the pot (see FIG. 1) the dents 34 at the base of the insert 28 engage the a rim 26 in the upper portion of the pot 20 and thereby help to prevent the insert 28 from slipping back into the pot 20. There are many dents 34 at the base of the insert 28 and these allow the insert 28 to rest at several different angles on top of the pot 20 while the dents engage the pot's upper rim 26. As an example, the insert 28 might rest on the pot 20 at 45 degrees, or 30 degrees or 60 degrees.

The upper rim 26 of the pot 20 may be its top edge, or, such as illustrated in FIG. 1, it may be a separate formed rim 26 in the side wall 22 of the pot 20.

The dents 34 in the insert base provide stops which engage the upper rim 26 of the pot 20 more securely than an insert base which is smooth and evenly rounded.

The insert 28 may be a formed screen mesh, or it may be molded, or be a formed sheet product having a plurality of drain holes, or it may have other configurations. Examples of such alternate fabrication details are well known and are not illustrated here for sake of simplicity.

As an example, the insert may be formed of drawn aluminum coated with a non-stick surface such as Teflon™ and penetrated with a series of drain holes in its curved side wall 30 and bottom 32.

The pot 20 may be a formed sheet product, or it may be molded, or it may have other configurations. As an example, the pot 20 may be drawn or spun aluminum.

Another example would be a microwavable pasta pot which has both its insert and pot molded from polypropylene or other suitable material.

Handles 36 in the upper portion of the insert 28 may facilitate lifting the insert 28 from the pot 20.

The invention may work for non-round pots having inserts as well. As an example, a pot and insert combination which is square or elliptical in plan view could have dents such as described above with the same advantages of more securely resting the tilted insert on the pot.

Figure 2:
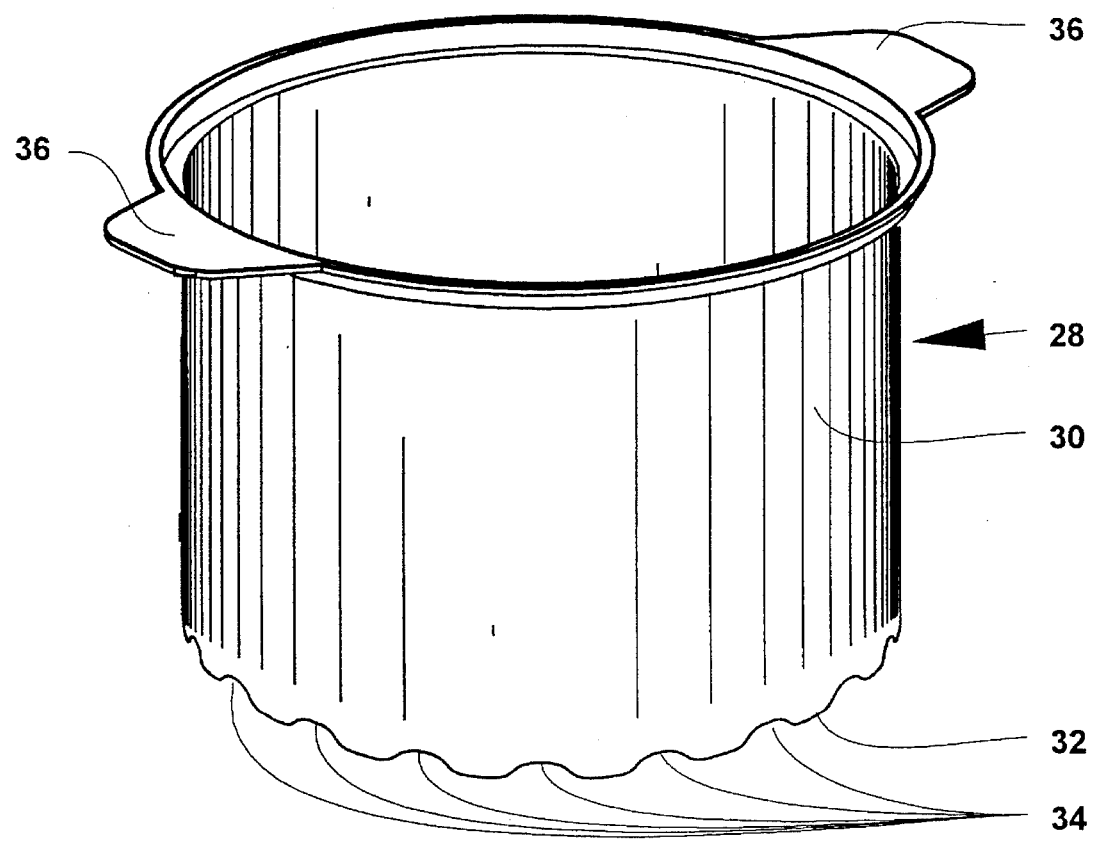
FIG. 2 shows a perspective view of the insert shown in FIG. 1.
Figure 3:
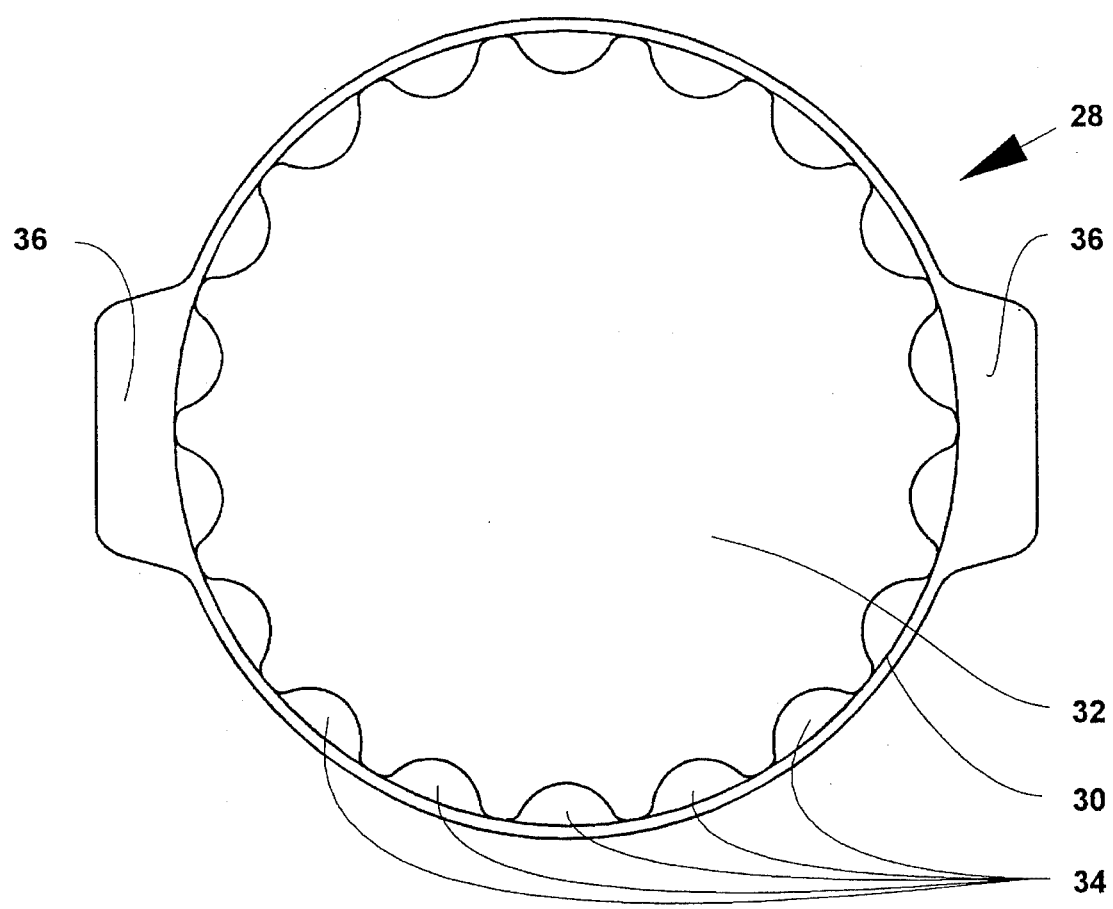
FIG. 3 shows an orthographic bottom view of the insert of FIG. 1.

The concave dents 34 may be replaced with holes the shape of each dent 34. The illustration of this embodiment would appear virtually identical to FIGS. 1, 2, and 3 and therefore is left out for sake of simplicity. In this embodiment, the dents 34 become holes piercing the insert 28 from its exterior to its interior. The holes 34, when the insert 28 is rested in a tilted position on top of the pot 20, engage the lip 26 on the pot 20 in the same way as the dents 34 described earlier, and thus the holes 34 help prevent the insert 28 from slipping and falling into the pot 20.

We claim:

1. A pot having a nesting insert which can be rested on top of the pot in a tilted position, said pot comprising:

a first vessel, said first vessel having a side wall, said first vessel having a bottom wall connected to said side wall, said first vessel having a concave interior, said first vessel having a peripheral ledge in the upper portion of said side wall, said peripheral ledge exposed to said first vessel's concave interior, a second vessel, said second vessel having a side wall, said second vessel having a bottom wall connected to said second vessel's side wall, said second vessel having a concave interior, said second vessel, when viewed from its exterior, having a plurality of concave dents where said side wall of said second vessel connects to said bottom wall of said second vessel, said second vessel configured to nest inside said concave interior of said first vessel, said second vessel configured to rest in a tilted position on said first vessel with two of its dents engaging said peripheral ledge in the upper portion of said side wall in said first vessel.

2. The pot of claim 1 further comprising said second vessel having two handles disposed in its upper portion and said handles being functional to lift said second vessel.

3. The pot of claim 1 further comprising said second vessel's bottom wall being pierced by a plurality of holes configured to drain liquid from said second vessel.

4. A pot having a nesting insert which can be rested on top of the pot in a tilted position, said pot comprising:

a first vessel, said first vessel having a peripheral side wall, said peripheral side wall connected to a bottom wall, said peripheral side wall and said connected bottom wall forming a concave interior, said first vessel having in the upper portion of said peripheral side wall a lip, said lip being exposed to said concave interior, a second vessel, said second vessel having a peripheral side wall, said peripheral side wall on said second vessel connected to a bottom wall on said second vessel, said peripheral side wall in said second vessel and said connected bottom wall in said second vessel forming a concave interior, said second vessel being penetrated by a plurality of openings where said peripheral side wall on said second vessel intersects said bottom wall on said second vessel, said second vessel configured to nest inside said concave interior of said first vessel, said second vessel configured to rest in a tilted position on said first vessel with two of its openings engaging said lip in the upper portion of said side wall in said first vessel.

5. The pot of claim 4 further comprising said second vessel having two handles disposed in its upper portion and said handles being functional to lift said second vessel.

6. The pot of claim 4 further comprising said second vessel's bottom wall being pierced by a plurality of holes configured to drain liquid from said second vessel.

7. A pot having a nesting insert which can be rested on top of the pot in a tilted position, said pot comprising:

a first vessel having a side wall with a top peripheral edge and a bottom wall connected to said side wall defining an open top and hollow interior, a second vessel having a side wall with a top peripheral edge and defining an open top and a hollow interior, a bottom wall connected to said side wall of said second vessel, said second vessel having a plurality of concave dents in said side wall of said second vessel in a location where said side wall connects to said bottom wall connected to said side wall of said second vessel, said second vessel configured to nest inside said hollow interior of said first vessel, said second vessel configured to nest inside said first vessel and being tiltable relative to said first vessel by engaging two of said dents with the top peripheral edge of said first vessel.

8. The pot of claim 7 and further comprising two handles connected to an upper portion of said side wall of said second vessel, said handles being functional to lift said second vessel.

9. The pot of claim 7, wherein said bottom wall connected to said side wall of said second vessel defines a plurality of openings configured to drain liquid from said second vessel.

* * * * *